Figure 1:
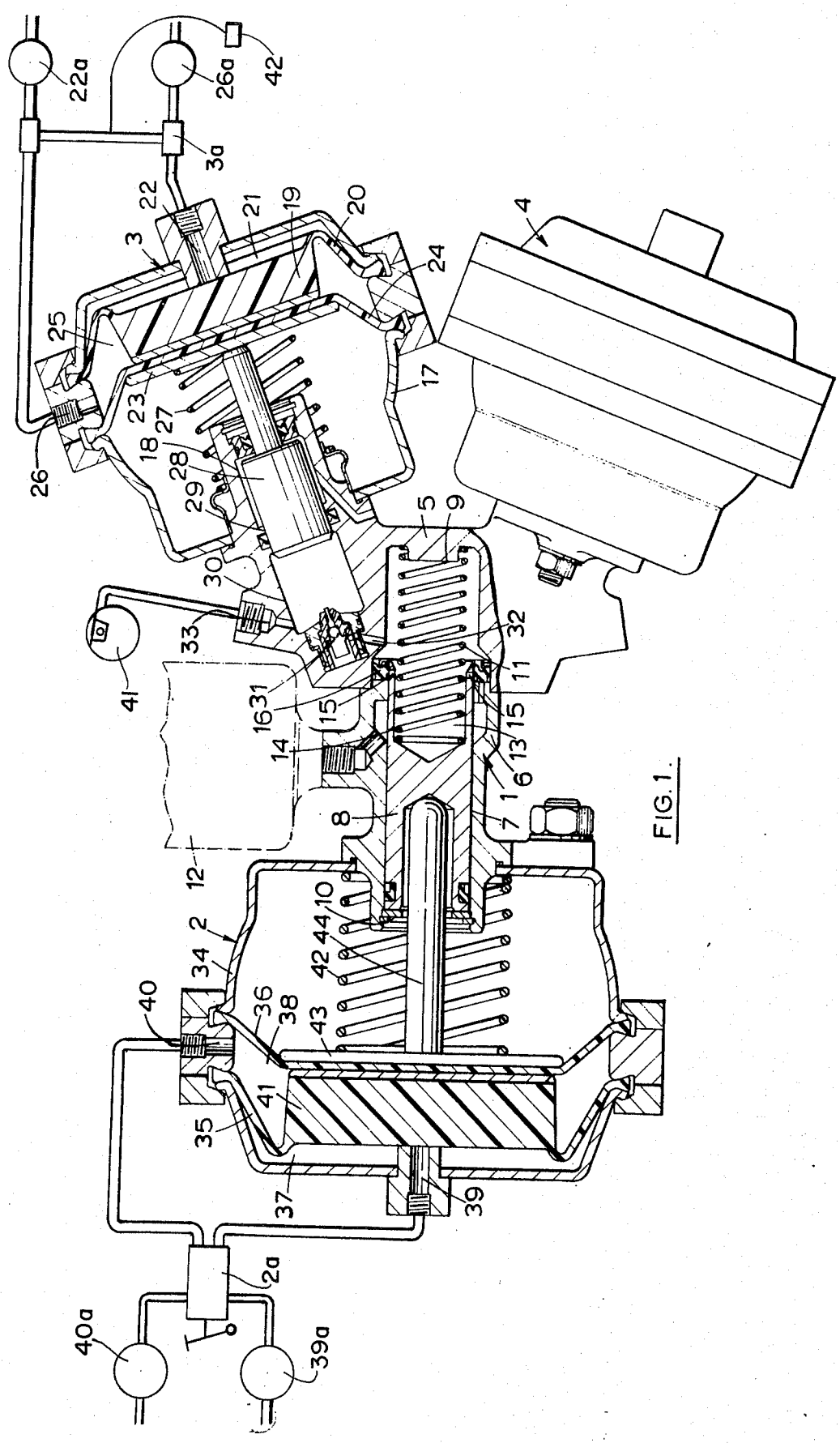

United States Patent [19]

Harries et al.

[11] 3,994,537

[45] Nov. 30, 1976

[54] ACTUATOR ASSEMBLIES FOR HYDRAULIC VEHICLE BRAKING SYSTEM

[75] Inventors: David Anthony Harries, Solihull; Frederick James Knight, Leamington Spa, both of England

[73] Assignee: Girling Limited, Birmingham, England

[22] Filed: May 5, 1975

[21] Appl. No.: 574,260

[30] Foreign Application Priority Data

May 18, 1974 United Kingdom............... 22267/74

[52] U.S. Cl. .......................... 303/21 CG; 188/181 A
[51] Int. Cl.[2] .......................................... B60T 8/04
[58] Field of Search .................. 60/534, 54.6, 550; 303/21 FB, 21 FM, 61, 115; 188/181 A

[56] References Cited
UNITED STATES PATENTS

| | | |
|---|---|---|
| 3,480,335 | 11/1969 | Inada ............................ 303/21 FM |
| 3,559,532 | 2/1971 | MacDuff........................... 60/550 X |
| 3,667,811 | 6/1972 | Okomoto et al. ............... 303/21 FM |
| 3,729,169 | 4/1973 | MacDuff........................ 303/21 FM |

Primary Examiner—Martin P. Schwadron
Assistant Examiner—Robert J. Miller
Attorney, Agent, or Firm—Scrivener Parker Scrivener and Clarke

[57] ABSTRACT

In a vehicle hydraulic braking system the supply of fluid from an hydraulic master cylinder to the slave cylinder of a wheel brake is controlled by an actuator assembly which includes a modulator assembly for controlling the supply to the slave cylinder in accordance with the deceleration of a wheel operated by the slave cylinder, and both the master cylinder and the actuator assembly are actuated in response to separate supplies of the same fluid pressure medium.

13 Claims, 2 Drawing Figures

ACTUATOR ASSEMBLIES FOR HYDRAULIC VEHICLE BRAKING SYSTEM

This invention relates to actuator assemblies for vehicle hydraulic braking system, the actuator assemblies being of the kind in which the supply of hydraulic fluid from the pressure space of an hydraulic master cylinder to at least one hydraulic slave cylinder of a wheel brake is regulated by means of at least one modulator assembly having a chamber communicating with the master cylinder and an outlet port for connection to the slave cylinder, and an expander piston working in a bore communicating with the chamber and movable between a first advanced position in which the effective volume of the chamber is at a minimum and a valve between the master cylinder and the outlet port is open, and a second retracted position in which the valve is closed and the effective volume of the chamber is larger, the expander piston normally being disposed in the first position but movable into the second position when the deceleration of a braked wheel operated by the slave cylinder exceeds a predetermined value, the position of the expander piston being controlled by a modulator member responsive to a signal from deceleration sensing means.

In known actuator assemblies of the kind set forth the master cylinder is remote from the modulator and is operated directly by a pedal and the modulator is responsive to a source of fluid pressure separate from the master cylinder.

According to our invention an actuator assembly of the kind set forth for an hydraulic braking system is combined with an hydraulic master cylinder, and the master cylinder is adapted to be actuated by fluid-pressure means, the modulator member being responsive to a fluid-pressure control signal.

Thus both the actuation of the master cylinder and the modulation of the braking pressure is controlled by a fluid-pressure medium, preferably pneumatic.

Conveniently the master cylinder is of the hydrostatic type so that only one source, for example, of pneumatic pressure, is required for the assembly. This facilitates installation in vehicles since the assembly can be operated from a source of compressed air.

Preferably the master cylinder is adapted to be actuated by a pressure-responsive actuating assembly of a pneumatically-operable relay valve with which it is combined.

Conveniently both the modulator assembly and the relay valve include a pair of spaced diaphragms of which both diaphragms of each pair are adapted to be subjected in the same direction to separate supplies of pneumatic pressure. This ensures that the relay valve and the modulator assemblies can be operated upon failure of one of the respective supplies of pneumatic pressure.

The master cylinder may be combined with a single modulator assembly. In such a construction the units may be in line with the bore of the master cylinder co-axial with that of the modulator assembly.

When the master cylinder is combined with more than one modulator assembly, for example two, the axes of the bores of the modulator assemblies are displaced with respect to the bore of the master cylinder in a radial direction, preferably being inclined thereto.

Figure 2:
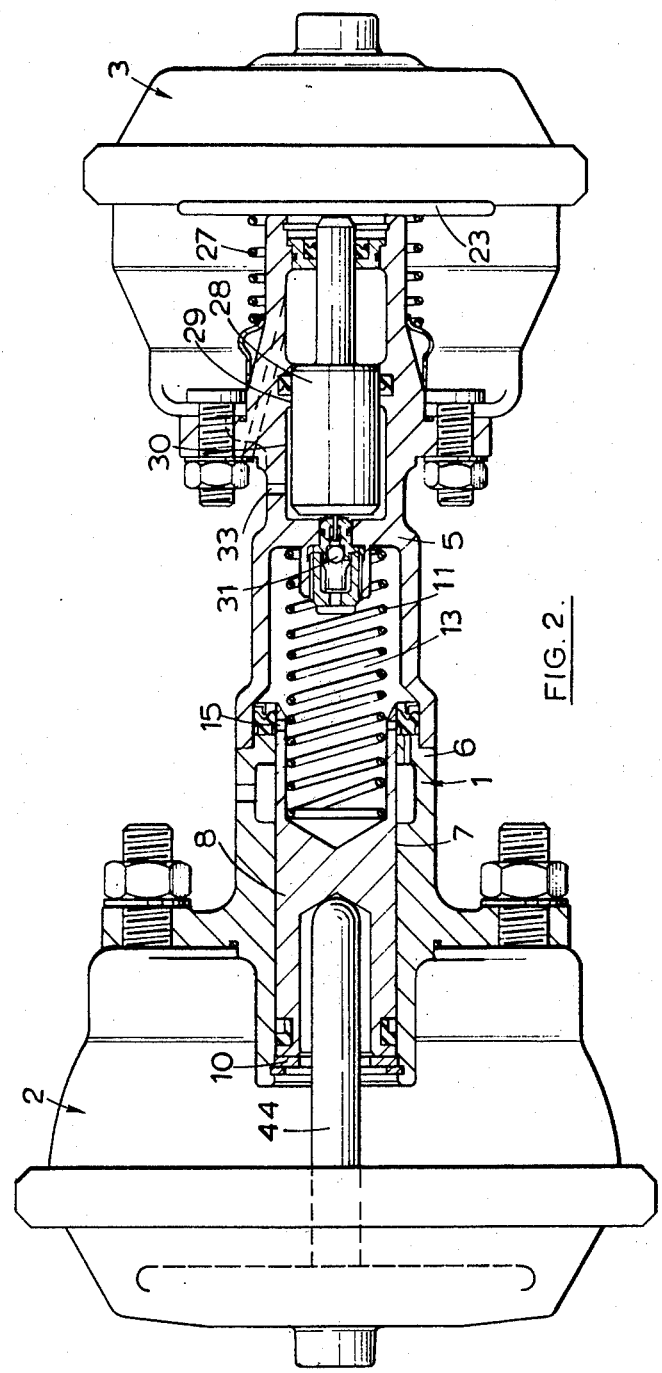

Two embodiments of our invention are illustrated in the accompanying drawings in which:

FIG. 1 is a longitudinal section through an hydraulic master cylinder combined with two modulator assemblies; and FIG. 2 is a plan of a similar assembly including a single modulator assembly and a longitudinal section through the master cylinder.

In the construction illustrated in FIG. 1 of the drawings a master cylinder 1 is adapted to be actuated by a pneumatically-operable actuator 2 and the supply of hydraulic pressure fluid to wheel brakes from the master cylinder 1 is modulated by a pair of modulator assemblies 3 and 4 incorporating a common manifold 5.

The master cylinder 1 comprises a housing 6 having an open-ended longitudinally extending bore 7 in which works a piston 8. One end of the housing 6 is sealingly received in a recess 9 in the manifold and normally the piston 8 is held in a retracted position in engagement with a backstop 10 by a compression return spring 11 acting between the piston 8 and the base of the recess. In this position a reservoir 12 for fluid is in free communication with a pressure space 13 defined by the recess 9 and a complementary recess 14 in the adjacent end of the piston 8 through a series of radial recuperation ports 15 in the piston 8 located on the side of a seal 16 which is adjacent to the reservoir 12 when the piston 8 is in the retracted position.

Each modulator assembly 3, 4 comprises a housing 17 which receives one of a pair of inclined spigot portions 18 of the manifold which diverge away from the master cylinder 1. A modulator member in the housing 17 comprises a piston block 19 carried by a flexible diaphragm 20 and a chamber 21 between the diaphragm 20 and the housing is in communication with an inlet port 22. The block 19 acts on a thrust plate 23 carried by a second diaphragm 24 and a chamber 25 between the diaphragm is in communication with an inlet port 26. Normally the piston block 19 is held in the retracted position shown by means of a compression spring 27. An expander piston 28 works in a bore 29 in the spigot portion 18 and the piston 28 projects at one end into a chamber 30 communicating with the bore 29. The opposite end of the piston 28 is engaged by the thrust plate 23.

A one-way valve 31 of known construction housed in the manifold 5 controls communication between an outlet passage 32 from the master cylinder 1 to an outlet port 33 for connection to the brakes through the chamber 30. In the position shown the valve 31 is shut.

The actuator 2 is similar in construction to the modulator assemblies 3, 4 comprising a housing 34 divided by spaced diaphragms 35 and 36 into a chamber 37 between the diaphragm 35 and the housing 34, and a chamber 38 between the diaphragms. The chamber 37 communicates with an inlet port 39, and the chamber 38 communicates with an inlet port 40. A thrust block 41 carried by the diaphragm 35 is normally held in the retracted position shown by means of a return spring 42 acting on a thrust plate 43 carried by the diaphragm 36. The plate 43 carries an axial extension or operating rod 44 engaging with the piston 8.

The ports 22 and 26 are connected through a normally open-control valve assembly 3a to separate sources or supplies 22a, 26a of pneumatic pressure so that the chambers 21 and 25 are pressurised to hold the expander pistons 28 in advanced positions in which the effective volumes of the chambers 30 are minima and the one-way valves 31 are open.

Similarly the port 39 and 40 are connected to separate sources or supplies of pneumatic pressure 39a, 40a through a pedal-operated treadle valve 2a which, when operated, pressurises the chambers to advance the rod 44 thereby operating the master cylinder 8 to deliver hydraulic fluid under pressure to the brakes from the outlet ports 33.

When the deceleration of a braked wheel 41 exceeds a predetermined value anti-skid sensing means 42 are operative to close the control valve assembly 3a to cut-off the supply of pneumatic pressure to the chambers of the corresponding modulator assembly 3, and thereafter relieve or otherwise dump the pressures from the chamber. The expander piston 28 then retracts in response to the force in the spring 27 and the hydraulic pressure, initially to permit the one-way valve 31 to close and thereafter to increase the effective volume of the chamber 30, thereby relieving the brake-applying hydraulic pressure. At the termination of the skid pressure is again applied to the diaphragm 20 and 24 with the result that the brake is re-applied, initially by pressurisation by the expander piston 28 of the fluid in the chamber 30, and then by the subsequent opening of the one-way valve 31.

The provision of two diaphragms in both the actuator 2 and the modulator assembly 3, 4 ensures that the brakes can still be applied and the brake pressure can still be relieved upon failure of one of the sources supplying each unit.

In the embodiment of FIG. 2 one of the modulator assemblies is omitted and the bore 29 is co-axial with the bore 7. The construction and operation of the assembly is otherwise the same and corresponding reference numerals have been applied to corresponding parts.

We claim:

1. In combination for a vehicle hydraulic braking system: an actuator assembly and an hydraulic master cylinder, said hydraulic master cylinder including a pressure space from which hydraulic fluid under pressure is adapted to be applied to the slave cylinder of a wheel brake, and fluid-pressure means are incorporated for actuating said master cylinder, and said actuator assembly is adapted to regulate the supply of hydraulic fluid from said pressure space to the slave cylinder in accordance with the deceleration of a braked wheel operated by the slave cylinder, said actuator assembly comprising at least one modulator assembly having a chamber communicating with said pressure space, an outlet port for connection to the slave cylinder, a bore communicating with said chamber, a valve between said pressure space and said outlet port, and an expander piston working in said bore and movable between a first advanced position in which the effective volume of said chamber is at a minimum and said valve is open, and a second retracted position in which said valve is closed and the effective volume of said chambers is larger, said expander piston normally being disposed in said first position but movable into said second position when the deceleration of said braked wheel exceeds a predetermined value, a modulator member for controlling the piston of said expander piston in response to a fluid-pressure control signal, and means for producing said fluid-pressure control signal, wherein a common fluid-pressure medium is utilised for actuating said master cylinder and for controlling said modulator member.

2. The combination as claimed in claim 1, wherein said fluid-pressure medium is pneumatic.

3. The combination as claimed in claim 1, wherein said master cylinder is of the hydrostatic type.

4. The combination as claimed in claim 1, including a pneumatically operable relay valve with said master cylinder is combined, and said relay valve incorporates a pressure-responsive actuating assembly for actuating said master cylinder.

5. The combination as claimed in claim 4, wherein both said modulator assembly and said relay valve include a pair of spaced diaphragms of which both diaphragms of each said pair are adapted to be subjected in the same direction to separate supplies of pneumatic pressure.

6. The combination as claimed in claim 1, wherein said master cylinder is combined with a single modulator assembly.

7. The combination as claimed in claim 6, wherein said master cylinder and said modulator assembly are in line with a bore of said master cylinder which defines said pressure space co-axial with said bore of said modulator assembly.

8. The combination as claimed in claim 1, wherein said master cylinder is combined with at least two modulator assemblies.

9. The combination as claimed in claim 8, wherein said axes of said bores of the modulator assemblies are displaced in a radial direction with respect to a bore of said master cylinder which defines said pressure space.

10. The combination as claimed in claim 9, wherein the said axes are inclined with respect to said bore.

11. A combined hydraulic master cylinder and actuator assembly for a vehicle anti-skid hydraulic braking system, comprising a housing having a first bore, a recuperation port for connection to a reservoir for fluid leading into said first bore, at least one outlet port for connection to a slave cylinder of a wheel brake, a second bore, and a chamber continuous with said second bore and interposed between said first bore and said outlet port, a master cylinder first piston working in said first bore and movable between a retracted piston in which said recuperation port is in communication with first bore, and an actuated position in which said recuperation port is isolated from said first bore and fluid in said first bore in advance of said first piston is pressurized, first fluid-pressure operable means for moving said first piston from said retracted position into said advanced position in response to an actuating fluid pressure, a valve between said first bore and said chamber, an expander second piston working in said second bore and movable between a first advanced position in which the effective volume of said chamber is at a minimum and said valve is open, and a second retracted position in which said valve is closed and the effective volume of said chamber is larger, second fluid-pressure operable means for urging said second piston into said advanced position in response to a fluid-pressure control signal, and biasing means for moving said second piston into said retracted position when deceleration of said braked wheel exceeds a predetermined value and said control signal decreases, whereby said pressure space is initially isolated from said chamber and said outlet port, and subsequently pressure at said outlet port is reduced by movement of said second piston into said retracted position.

12. An assembly as claimed in claim 11, wherein said actuating fluid pressure is supplied to said first fluid-pressure operable means from a supply of fluid pressure under the control of a pedal-operated treadle valve.

13. An assembly as claimed in claim 11, wherein said fluid-pressure control signal is applied to said second fluid-pressure operable means through a normally open valve which is movable into a closed position when the declaration of said braked wheel exceeds the said predetermined value.

* * * * *